(12) United States Patent
Mottur et al.

(10) Patent No.: US 8,004,561 B2
(45) Date of Patent: Aug. 23, 2011

(54) METHODS AND SYSTEMS FOR NETWORKED CAMERA CONTROL

(75) Inventors: Peter A. Mottur, Portsmouth, RI (US); Ethan Z Zimmer, East Greenwich, RI (US)

(73) Assignee: Smiths Detection Inc., Middleton, RI (US)

( * ) Notice: Subject to any disclaimer, the term of this patent is extended or adjusted under 35 U.S.C. 154(b) by 878 days.

(21) Appl. No.: 11/730,539

(22) Filed: Apr. 2, 2007

(65) Prior Publication Data

US 2007/0183768 A1 Aug. 9, 2007

Related U.S. Application Data

(63) Continuation of application No. 09/912,869, filed on Jul. 25, 2001, now Pat. No. 7,199,817.

(60) Provisional application No. 60/221,674, filed on Jul. 26, 2000.

(51) Int. Cl.
*H04N 7/18* (2006.01)
(52) U.S. Cl. ........................ 348/143; 348/153
(58) Field of Classification Search ........... 348/142–160
See application file for complete search history.

(56) References Cited

U.S. PATENT DOCUMENTS

| | | |
|---|---|---|
| 5,111,291 A | 5/1992 | Erickson et al. |
| 5,467,402 A | 11/1995 | Okuyama et al. |
| 5,473,368 A | 12/1995 | Hart |
| 5,515,099 A | 5/1996 | Cortjens et al. |
| 5,583,565 A | 12/1996 | Cortjens et al. |
| 5,600,368 A | 2/1997 | Matthews, III |
| 5,619,183 A | 4/1997 | Ziegra et al. |
| 5,625,410 A | 4/1997 | Washino et al. |
| 5,717,379 A | 2/1998 | Peters |
| 5,729,471 A | 3/1998 | Jain et al. |
| 5,761,280 A | 6/1998 | Noonen et al. |
| 5,812,054 A | 9/1998 | Cohen |

(Continued)

FOREIGN PATENT DOCUMENTS

EP 0 715 453 A 6/1996

(Continued)

OTHER PUBLICATIONS

Anonymous, "Virtual Monitoring for Viewing UUT (Unit Under Test) remotely Via Network," Research Disclosure, 2001, p. 1032, Havant, UK, Article No. 446147, XP-002233249. The whole document.

(Continued)

*Primary Examiner* — Andy S Rao
(74) *Attorney, Agent, or Firm* — Foley & Lardner LLP

(57) ABSTRACT

Methods and systems for providing fluid real-time camera control of at least one camera to at least one network user via a network including the internet. A control pad or area can be provided to camera users via an application or applet that can be calibrated to provide fluid camera control. Compressed or uncompressed analog, digital, or streaming video and audio data can also be provided to the users to allow real-time low latency continuous audio/visual feedback. Multiple camera users can obtain control of a camera using a dynamic queuing technique that can allow single user camera control for certain time intervals. An administrator can establish user camera control parameters including camera control intervals for subscriber users versus non-subscriber users, camera usurping by an administrator, elimination of camera control privileges for a user, and denial of camera control requests by a user.

66 Claims, 5 Drawing Sheets

U.S. PATENT DOCUMENTS

| | | | |
|---|---|---|---|
| 5,815,080 A | 9/1998 | Taguchi | |
| 5,838,368 A | 11/1998 | Masunaga et al. | |
| 5,838,682 A | 11/1998 | Dekelbaum et al. | |
| 5,903,455 A | 5/1999 | Sharpe, Jr. et al. | |
| 5,917,405 A | 6/1999 | Joao | |
| 5,987,519 A | 11/1999 | Peifer et al. | |
| 6,008,837 A | 12/1999 | Yonezawa | |
| 6,075,553 A | 6/2000 | Freeman et al. | |
| 6,128,298 A | 10/2000 | Wootton et al. | |
| 6,185,601 B1 | 2/2001 | Wolff | |
| 6,208,379 B1 | 3/2001 | Oya et al. | |
| 6,226,031 B1 | 5/2001 | Barraclough et al. | |
| 6,243,129 B1 | 6/2001 | Deierling | |
| 6,271,752 B1 | 8/2001 | Vaios | |
| 6,271,805 B1 | 8/2001 | Yonezawa | |
| 6,292,098 B1 | 9/2001 | Ebata et al. | |
| 6,414,716 B1 | 7/2002 | Kawai | |
| 6,529,234 B2 | 3/2003 | Urisaka et al. | |
| 6,538,663 B2 | 3/2003 | Kamei | |
| 6,567,121 B1 | 5/2003 | Kuno | |
| 6,583,663 B1 * | 6/2003 | Disney | 327/566 |
| 6,680,746 B2 | 1/2004 | Kawai et al. | |
| 6,698,021 B1 | 2/2004 | Amini et al. | |
| 6,720,987 B2 | 4/2004 | Koyanagi et al. | |
| 6,856,346 B1 | 2/2005 | Kobayashi et al. | |
| 6,983,419 B1 * | 1/2006 | Yonezawa et al. | 715/722 |

FOREIGN PATENT DOCUMENTS

| | | |
|---|---|---|
| EP | 0 821 522 A | 1/1998 |
| EP | 0 884 909 | 12/1998 |
| EP | 1 152 617 | 11/2001 |
| EP | 1 202 569 | 5/2002 |
| GB | 2 325 548 A | 11/1988 |
| JP | 11027766 | 1/1999 |
| WO | WO 96 02106 A | 1/1996 |

OTHER PUBLICATIONS

Anonymous, "Connecting a USB Camera to a LAN," Research Disclosure, 1999, vol. 42, No. 421, XP002233250, Havant, UK Article No. 4211421. The whole document.

"Computerizing Video Surveillance Techniques," IBM Technical Disclosure Bulletin, IBM Corp., 1992, pp. 403-404, vol. 35, No. 5, ISSN: 0018-8689 New York, US, XP000313026. The whole document.

"Direct Control of a Video Camera on a Video Monitoring Screen," IBM Technical Disclosure Bulletin, IBM Corp., 1994, pp. 530-540, vol. 37, No. 48, ISSN: 0018-8689 New York, US XP000451342. The whole document.

* cited by examiner

METHODS AND SYSTEMS FOR NETWORKED CAMERA CONTROL

CLAIM OF PRIORITY

This application claims priority to U.S. Ser. No. 60/221,674, entitled "Systems And Methods For Delivering Live Action Feeds Over A Computer Network", filed on Jul. 26, 2000, naming Peter Mottur and Ethan Z. Zimmer as inventors, the contents of which are herein incorporated by reference in their entirety and is a continuation of U.S. Ser. No. 09/912,869, entitled "Methods And Systems For Networked Camera Control", filed on Jul. 25, 2001 now U.S. Pat. No. 7,199,817, naming Peter Mottur and Ethan Z. Zimmer as inventors, the contents of which are also herein incorporated by reference in their entirety.

BACKGROUND (1) Field

The disclosed methods and systems relate generally to delivering content over a computer network, and more particularly to providing content related to live action feeds controlled over the network by network users.

(2) Description of Relevant Art

The internet provides a platform for allowing the distribution of information and data such as multimedia data. Accordingly, one internet application includes broadcasting multimedia entertainment and other live action programming. Several internet websites exist that allow users to obtain live action programming that can be streamed throughout the internet to internet users. These websites can be integrated with one or more cameras, otherwise known as "webcams," that can be located at locations to capture a particular field of view. Internet users having an internet browser with the necessary plug-ins or software applications, can receive the broadcast image data from the fixed camera locations. For example, websites can include points of views for major landmarks or other central locations in various cities to allow internet users to view the weather or scenery in the camera field of view. Other websites can utilize the fixed field of view to capture, for example, commonly congested traffic areas. Unfortunately, in the latter example, there could be a traffic problem at another area on a given day, that is not within the field of view. The information or data provided from the fixed field of view therefore may not provide sufficient information to a user on a given day. In other applications, a camera can be used to view or monitor a moving subject. If the subject moves outside the camera field of view, the monitoring user may not be able to perform the monitoring function. Some systems provide limited control of camera motion, but such control can be particular to a specific individual, user, and/or network location or device, and such control can also be extremely limited to discrete camera movements. Furthermore, many multimedia broadcasts include significant delays between image updates, resulting in choppy broadcasts that can appear to be, or may be, a string of static images that are presented with a discernible delay between successive images.

SUMMARY

The disclosed methods and systems provide control of at least one camera to at least one network user. The camera(s) and network users can be in communication with each other through a network including the internet or a public or private network. The network users can utilize a microprocessor-controlled device that includes or displays an interface, including a graphical user interface (GUI), database or scripting interface, menu driven interface, etc., that can be collectively referred to herein as an interface. The interface can provide data from which camera control commands can be generated and transferred to the camera. Additionally, the camera can provide video (and audio) data for display or presentation to the network user. The audio/video data can be provided in real-time using uncompressed analog or digital streaming modes/formats to provide continuous feedback to the network user.

The connection between the network user and the camera(s) can facilitate communications via fiber optic, infrared, satellite, Radio Frequency (RF), microwave, cable, or Internet Protocol (IP), or other communications modes and/or protocols.

The interface can be provided by an applet or an application. In one embodiment, the interface can have a control area that can have a cursor within the control area. Movement of the cursor within the control area can be translated to camera controls. For one embodiment, the control area can be calibrated such that continuous commands can be provided to the camera based on the cursor position while the cursor is active. In one embodiment, while the cursor is active, pan and tilt commands can be provided to the robotic pan/tilt head to which the camera is mounted, connected, or otherwise in communications. When the cursor is inactive, camera commands may not be provided to the camera. The interface can also have options for adjusting focus and zoom.

In some embodiments, control commands can be mapped or otherwise associated with keyboard features including keys, and/or other peripheral devices including joysticks, control panels, and touchscreens, using, for example serial cables (RS-232, 422, 485), Universal Serial Bus (USB), FireWire, other communications protocols and/or devices.

The disclosed methods and systems also include at least one queue for administering control between the network users and the cameras. Network users can request control of a camera, and depending upon whether the network user is a subscriber or non-subscriber, the network user can be provided or otherwise associated with a camera control time interval, and placed in the queue. Camera control can be determined from the queue position, with a single user having control of a camera at a given time, and for a given time interval that can be equal to the camera control time interval associated with the user.

In some embodiments, a system administrator can establish the control intervals for subscribers and non-subscribers. A system administrator can also provide conditions or rules by which queue position can be determined. Furthermore, a system administrator can usurp control of the camera, remove a user from the queue, and deny a request from a user by preventing a user from obtaining position in a queue.

Other objects and advantages will become apparent hereinafter in view of the specification and drawings.

DESCRIPTION

Figure 1:
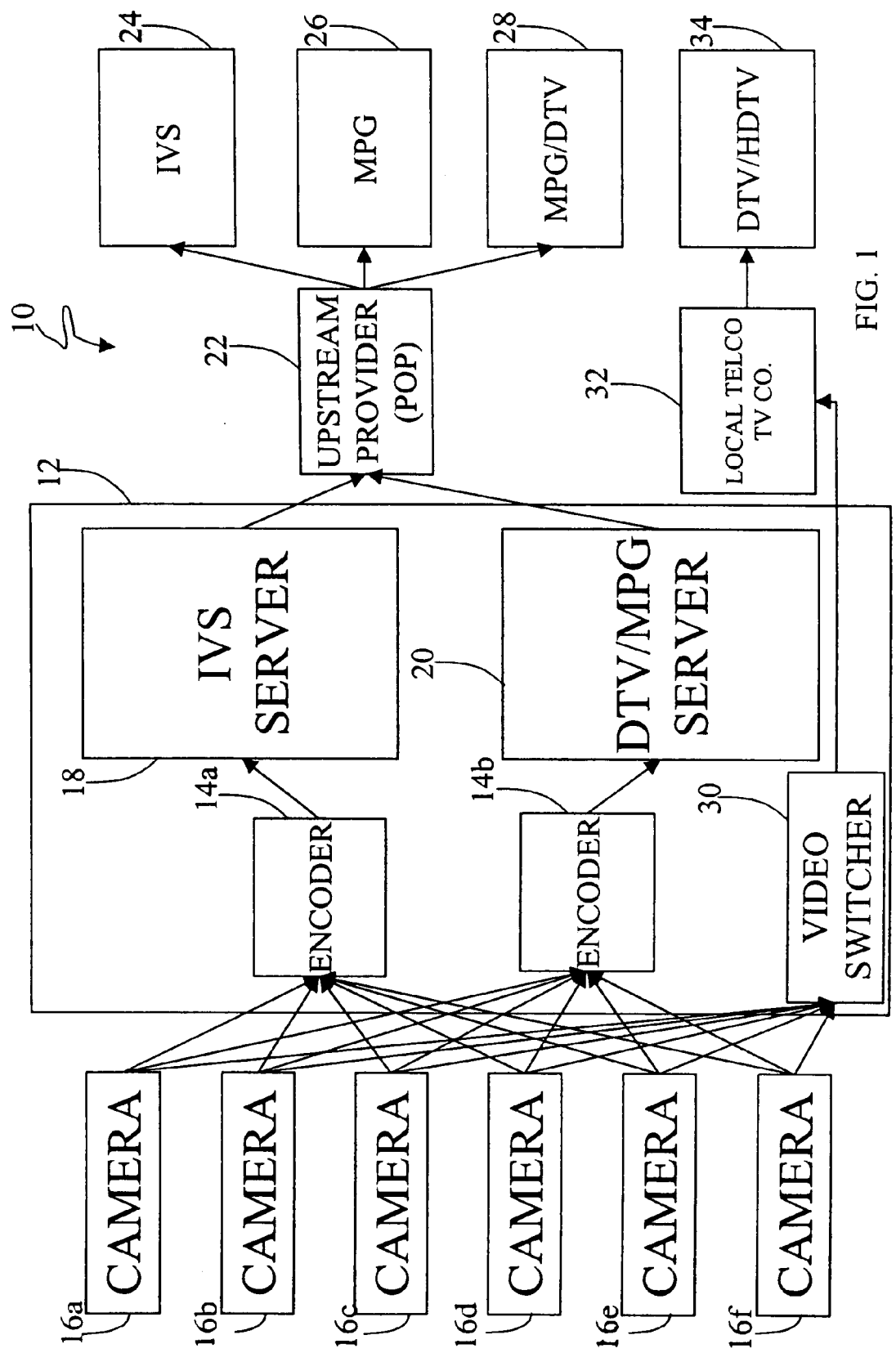
FIG. 1 is a block diagram presenting features of the methods and systems disclosed herein.

To provide an overall understanding, certain illustrative embodiments will now be described; however, it will be understood by one of ordinary skill in the art that the systems and methods described herein can be adapted and modified to provide systems and methods for other suitable applications and that other additions and modifications can be made without departing from the scope of the systems and methods described herein.

For the purposes of the disclosed methods and systems, references to a camera can include references to a camera system that can include a robotically controlled camera and a robotic pan/tilt head to which the camera can be connected, and a processor that can control camera features including white/black balance, iris, gain, RGB, phase, timing, SC, and other like features that can be collectively referred to herein as camera presets. In some embodiments, the camera includes a pan/tilt head, while in other embodiments, the pan/tilt head can be separate from the camera. Accordingly, in some embodiments, references to camera as provided herein, can include references to one or more processors (e.g., processor associated with the camera and a processor associated with pan/tilt head; one processor for the camera and the pan/tilt head, etc.).

The disclosed methods and systems include methods and systems for providing real-time continuous streaming video and audio data from at least one remote camera system and/or location, to network users on a network such as the internet an another public or private network. Furthermore, the methods and systems allow the network users to interactively control the cameras using continuous control methods and systems, wherein continuous camera control can be understood herein to include control commands provided at fixed intervals. The network users can control camera pan, tilt, zoom, focus, and camera presets using, in one embodiment, a user interface in the form of a control or touch pad. In some embodiments, focus and zoom controls can be provided using "rocker" type buttons on the user interface that have up/down or +/− controls. In another embodiment, for example, slider controls can be used for variable speed control, and such examples are provided for illustration and not limitation. The pan, zoom, focus, and tilt controls can be fluid controls to allow control commands to be provided to the camera(s) in a continuous manner as provided herein, for fluid camera movement. The methods and systems can be employed in television or network broadcast, cable, satellite, wireless, and/or broadband applications, thereby enabling user interactivity over network/internet connections, digital or analog set-top boxes, and/or handheld wireless remote control devices. In some embodiments, the methods and systems also provide user queuing techniques to allow shared and ordered control of the cameras by the network users. Administrative usurping of camera control from network users can be allowed.

The methods and systems herein are not limited to the communication channel by which the camera control and/or video/audio streaming data can be communicated. Although examples of communications channels can include fiber optic, infrared, satellite, Radio Frequency (RF), microwave, cable, Internet Protocol (IP), etc., such examples are provided for illustration and not limitation.

Referring now to FIG. 1, there is an architectural block diagram 10 providing features for the methods and systems disclosed herein. Those with ordinary skill in the art will recognize that FIG. 1, and other figures provided herein, can be provided for discussion purposes to illustrate features of the disclosed methods and systems. Accordingly, it can be understood that such features or parts thereof, unless otherwise noted, can be combined, further expanded upon with additional detail, and/or otherwise eliminated, without departing from the scope of the methods and systems.

FIG. 1 presents a system that includes a regional distribution center 12 that can otherwise be understood as a Network Operating Center (NOC). The center 12 can include one or more encoders 14a, 14b, that can accept uncompressed audio-video input from one or more cameras 16a-16f. The encoder outputs can be input to an Internet Video Streaming (IVS) web server 18 and a Direct Television (SDI/DTV) or MPEG (MPG) video server 20. The servers 18, 20 can communicate with a point-of-presence (POP) server 22 to distribute audio-visual data from the cameras 16a-16f using IVS 24, MPEG (MPG) 26, or MPG/DTV 28 audio-video formats. The audio-video formats can additionally be compatible with Real Networks, Windows Media Player, Quicktime, MPEG-2, etc., where such examples are provided for illustration and not limitation. The audio-visual data from the cameras 16a-16f can additionally and optionally be presented to a video switcher 30 and thereafter to a telephone communications provider or television company 32 that can distribute compressed or uncompressed audio-video data for broadcast in a format that can include analog or digital television (SDI/DTV), including high-definition digital television (HDTV) 34.

The FIG. 1 cameras 16a-16f can include, for example, robotically controlled cameras that can be commercially available from manufacturers including Panasonic, Sony, Canon, Pelco, Hitachi, Fujinon, Phillips, JVC, and Sensormatic, with such examples provided merely for illustration and not limitation. As indicated previously, the cameras 16a-16f can communicate uncompressed audio and video data to the center 12 using fiber optic cable, for example. The encoders 14a, 14b can encode the uncompressed video data for presentation to the servers 18, 20 that can thereafter distribute the data over a network or other communications link. Although the illustrated encoders 14a, 14b receive inputs from multiple cameras 16a-16f; other embodiments can include a one-to-one relationship between encoders 14a, 14b and cameras 16a-16f.

The illustrated web server 18 can be equipped with software, hardware, or a combination thereof, that can convert the data for compatibility with MPEG 1/2/4, JPEG, M-JPEG, RTP, RTSP, or Java Media Framework (JMF), or other formats that can be compatible with, for example, a Quick Time server, a Real Player server, a Windows Media server, or another server that can deliver audio-video data over a network.

The illustrated video server 20 can also compress the uncompressed audio-video data from the encoders 14a, 14b, to allow a format suitable for delivery over a network. As FIG. 1 illustrates, the POP server 22 can receive data from either the web server 18, the video server 20, or both.

The illustrated servers 18, 20, 22 can be one or more microprocessor-based systems including a computer workstation, such as a PC workstation or a SUN workstation, handheld, palmtop, laptop, personal digital assistant (PDA), cellular phone, etc., that includes a program for organizing and controlling the server 18, 20, 22 to operate as described herein. Additionally and optionally, the server 18, 20, 22 can be equipped with a sound and video card or device for processing multimedia data. The server 18, 20, 22 can operate as a stand-alone system or as part of a networked computer system. Alternatively, the server 18, 20, 22 can be a dedicated device, such as an embedded system, that can be incorporated into existing hardware devices, such as telephone systems, PBX systems, sound cards, etc. In some embodiments, servers 18, 20, 22 can be clustered together to handle more traffic, and can include separate servers for different purposes such as a database server, an application server, and a Web presentation server. The server 18, 20, 22 can also include one or more mass storage devices such as a disk farm or a redundant array of independent disks ("RAID") system for additional storage and data integrity. Read-only devices, such as compact disk drives and digital versatile disk drives, can also be connected to the server 18, 20, 22. Additionally and optionally, the client-server model is well known as a relationship between a requester program, otherwise known as the client, and the program that services the request, otherwise known as a server 18, 20, 22. It is also well-known that the client and server 18, 20, 22 can reside on the same device, and such understanding can be applied to the disclosed methods and systems and to FIG. 1, where the servers 18, 20, 22 can also be viewed as clients in the client-server model. As used herein, the term "server" is intended to refer to any of the above-described servers.

For a system according to FIG. 1, data from the cameras 16a-16f can be multiplexed and provide for lower bandwidth video that can be viewed on conventional internet devices that can utilize web browsers and/or at least one software application. The multiplexed video data can be provided on-demand from the video server 20 to data network users that, in one embodiment, utilize Internet Protocol (IP). As indicated herein, the video data can be distributed over private networks or public networks such as the internet.

In some embodiments, the audio-video data from the cameras 16a-16f can be communicated using an intra-lata (local access transport area) service that can otherwise be known as local toll, regional, or zone service. The intra-lata service can also be used for distributing the audio-video data from the center 12 to the network.

Figure 2:
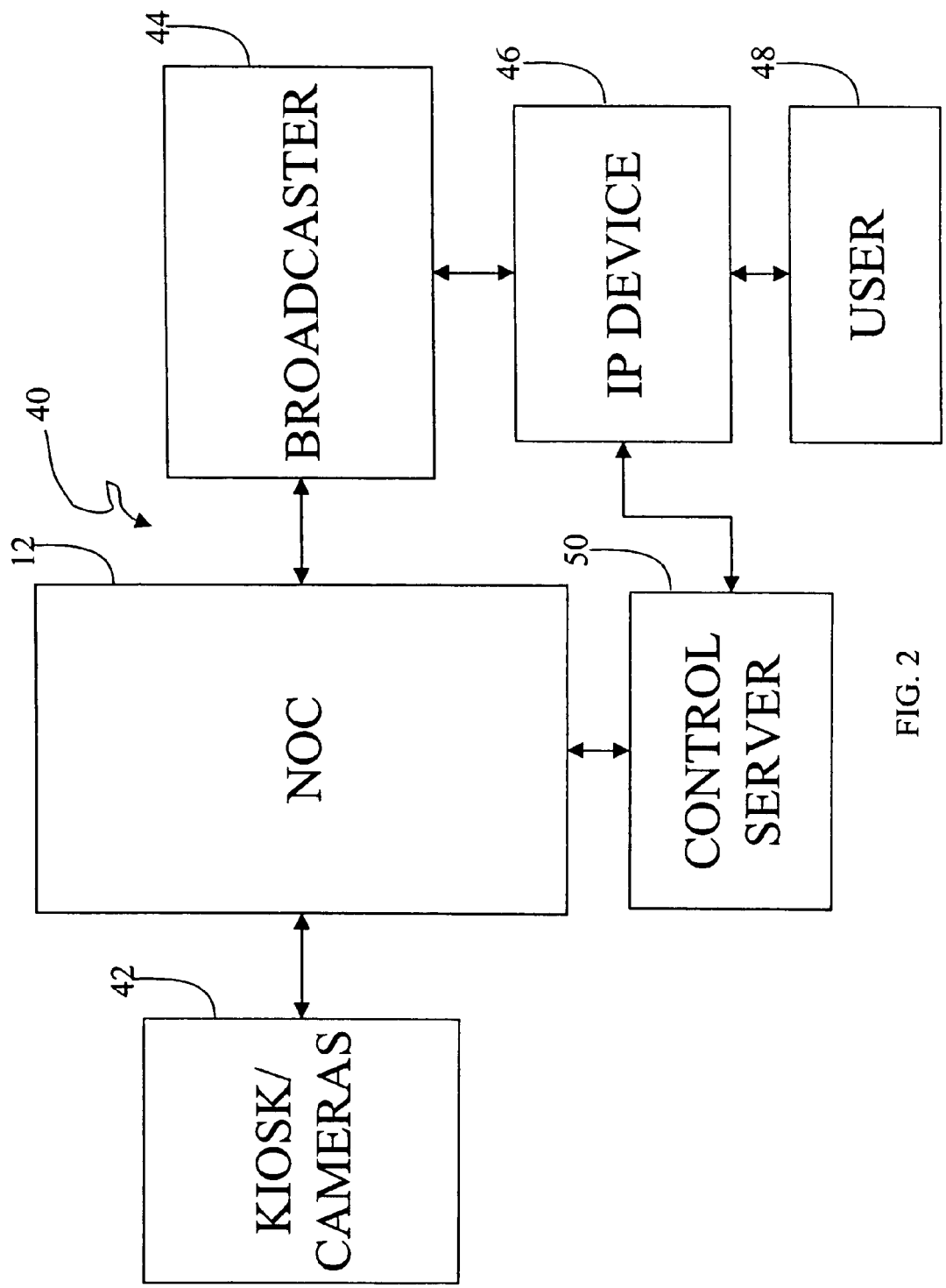
FIG. 2 is a diagram of one embodiment for television broadcasting.

Referring now to FIG. 2, there is a system 40 for coupling or integrating a kiosk 42 to the center or NOC 12 and thereafter to a broadcaster 44 to exchange data between the kiosk and the broadcaster 44. In the FIG. 2 system, an IP device 46 can couple at least one internet user 48 to the broadcaster 44 to receive audio-video data from the kiosk 42. The broadcaster 44 can optionally and additionally transfer the data through a television broadcast.

The FIG. 2 kiosk 42 can include a robotic camera as described previously herein. Furthermore, the kiosk 42 can be equipped with a video prompter, audio devices (microphones, mixers, compressors, speakers, etc.), and a microprocessor-controlled device that allows remote control of the camera, lighting, LCD ticker, microphones, and other systems integrated with the kiosk. Accordingly, the internet users 48 can interact (i.e., via IP control) with the broadcast from the kiosk 42 by controlling the camera via a control server 50. The control server 50 can allow control by providing a graphical user interface, for example, to the users 48 to allow the users 48 to control the kiosk camera(s) and hence interact with the television broadcast. The graphical user interface can be provided, for example, using a Java applet or an application.

Figure 3:
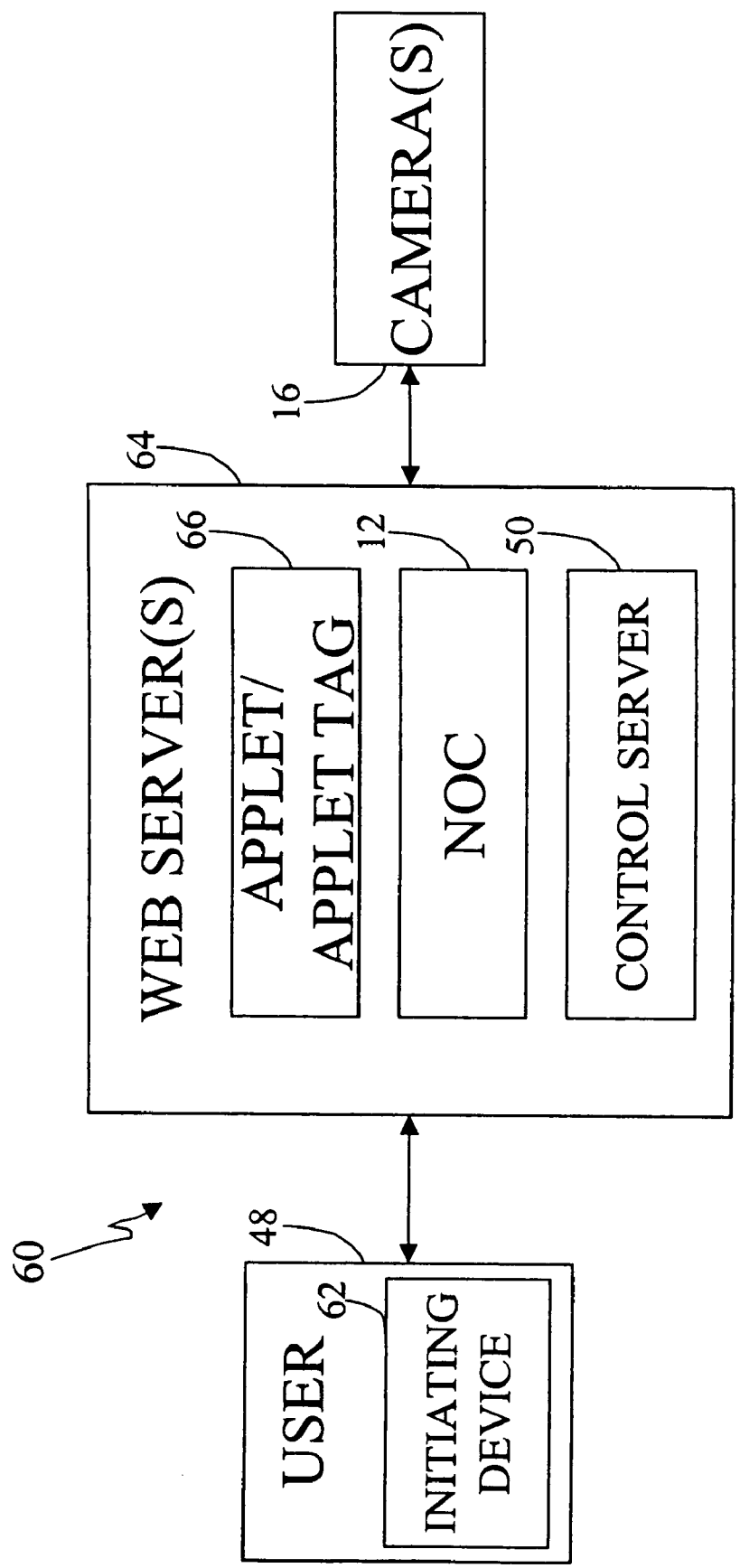
FIG. 3 displays an alternate embodiment for the methods and systems.

Referring now to FIG. 3, there is a block diagram 60 for representing systems and methods that can be integrated with the systems and methods of FIGS. 1 and 2. Those with ordinary skill in the art will recognize that FIGS. 1, 2, and 3, and other Figures provided herein, can provide similar features of varying detail. Accordingly, as illustrated in FIGS. 2 and 3, the user 48 can be understood to include an initiating device 62 that can include a digital computer system that can utilize a wired or wireless communications link to connect to a communication network such as the internet. The user(s) 48 of the initiating device 62 can utilize different peripheral devices that can be integrated with or otherwise configured for compatible use with the initiating device 62. For example, the initiating device 62 can include a keyboard, keypad, stylus, joystick, digital camera, microphone, etc., that can communicate data to the initiating device using wired or wireless communications systems and/or protocols, etc. The initiating device 62 can be a microprocessor-based system including a computer workstation, such as a PC workstation or a SUN workstation, handheld, palmtop, laptop, personal digital assistant (PDA), cellular phone, etc., that includes a program for organizing and controlling the initiating device 62 to operate as described herein. Additionally and optionally, the initiating device 62 can be equipped with a sound and video card for processing multimedia data. The initiating device 62 can operate as a stand-alone system or as part of a networked computer system. Alternatively, the initiating device 62 can be a dedicated device, such as an embedded system, that can be incorporated into existing hardware devices, such as telephone systems, PBX systems, sound cards, etc. Accordingly, it will be understood by one of ordinary skill in the art that the initiating device 62 described herein has wide applicability and can be incorporated in many systems, and realized in many forms.

For a system according to FIG. 3, the initiating device 62 can be connected to a network such as the internet and can be equipped with what is well-known as an internet "browser" such as the commercially available Netscape Navigator, Internet Explorer, etc., browsers, and those with ordinary skill in the art will recognize that, depending upon the initiating device 62 and its configuration, the browser can differ, and hence references herein to a browser can include references to a user interface to the internet or other network, wherein the methods and systems herein are not limited to the browser or other network interface. Furthermore, the initiating device 62 can access the internet using wired or wireless communications links and/or protocols.

Referring again to FIG. 3, the user 48, via the initiating device 62, can request information via a network from one or more web servers 64, for example. The illustrated web server 64 can include features that have previously been described in relation to the NOC 12 and the control server 50. Additionally and optionally, the web server 64 can include one or more applets and/or applet tags 66 that can cause an applet on the web server 64 or another server (or web server) to be communicated or otherwise available to the initiating device 62. For the methods and systems disclosed herein, an applet or applet tag 66 can provide at least one interface that, in the illustrated embodiments is a graphical user interface (GUI), for display on the initiating device 62. Those with ordinary skill in the art will recognize that the interface is not limited to an interface, and can include, for example, database or scripting interface, menu driven interface, etc., and accordingly references herein to a or the interface can be understood to be references to an interface that can operate according to the methods and systems disclosed herein. For example, in a database interface, a camera 16 can be positioned at predetermined locations at corresponding times.

In one embodiment of the FIG. 3 systems and methods, an interface can be manipulated or otherwise controlled by the user, and the control can be communicated to the camera(s) 16. Furthermore, another applet 66, or additionally and optionally, an application residing on the initiating device 62, can cause the initiating device 62 to display or otherwise present audio/visual data to the user 48 in a real-time continuous streaming mode. The user 48 can, through the interface, control the camera 16 with real-time continuous audio/visual feedback.

As indicated previously herein, in some embodiments, the web server 64 can be a separate device or program from the control server 50, the NOC 12, and other features of the web server 64. For example, in an embodiment, the control server 50 and NOC 12 can be separate servers and can have separate processors that can be in communication with the web server 64. Additionally and optionally, the NOC features 12 and the control server 50 can be integrated with the initiating device 62 or one or more processors related to or otherwise associated with the camera 16. Those with ordinary skill in the art will thus recognize that there are various configurations of the FIG. 3 system that can be employed without departing from the methods and systems provided herein.

Figure 4:
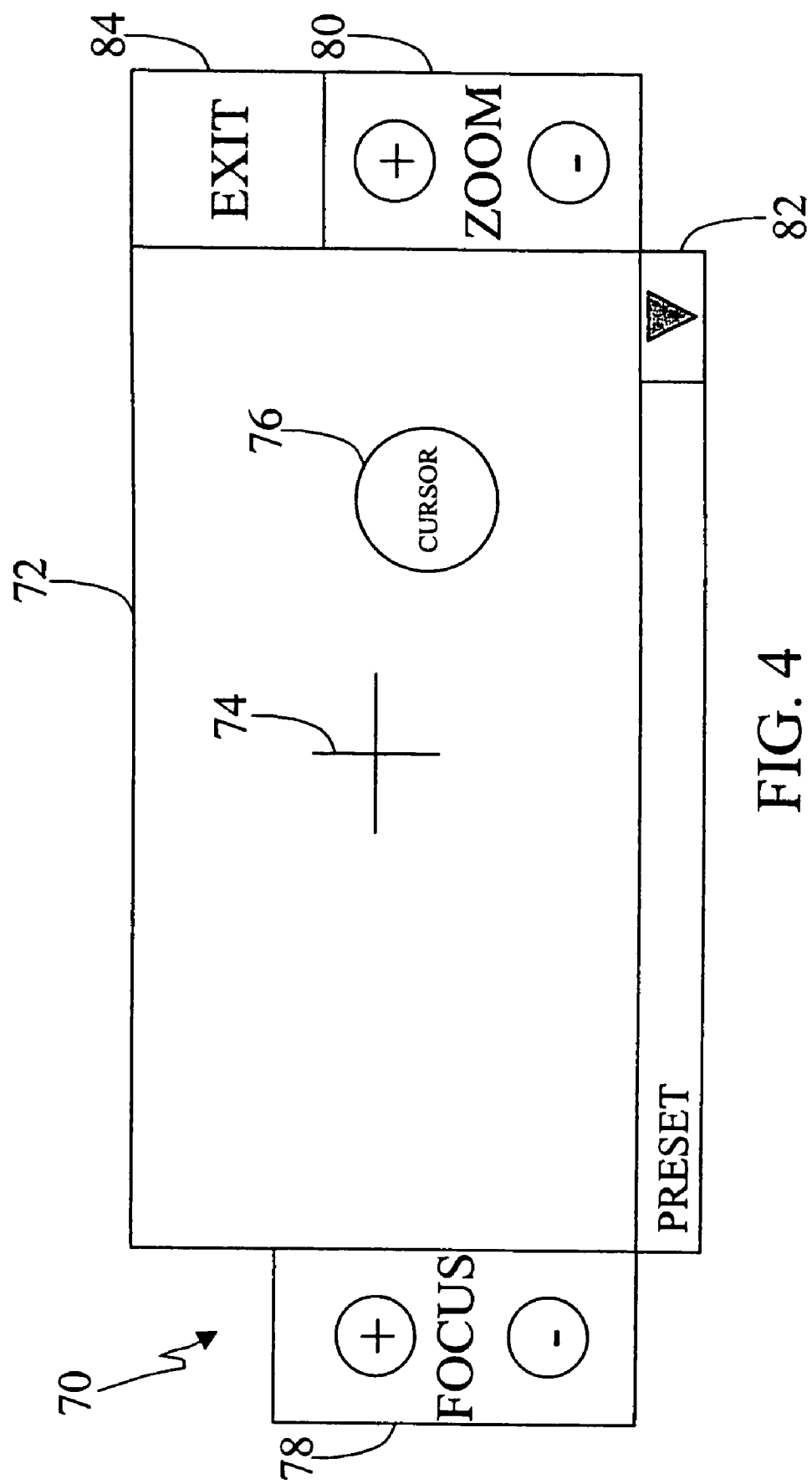
FIG. 4 presents one user interface for control of a camera(s)

Referring now to FIG. 4, there is an illustration of one interface that is a graphical user interface (GUI) 70 that can be provided to the initiating device/user 62, 48 for controlling the camera 16 according to a system of FIG. 3. The FIG. 4 interface 70 can be presented with a window or other presentation of audio/visual data such that the user 48 can view audio/video data based on the camera 16 positioning, as the user 48 controls the camera 16.

The illustrated interface 70 includes a control pad or area 72 that includes an origin designation 74 that, in the illustrated embodiment, is a "+", although other origin designations can be used. The control pad also includes a cursor 76 that can be controlled by the user 48. For example, in one embodiment, the user 48 can control the cursor 76 by dragging the cursor with a mouse, stylus, joystick, or other peripheral device that can be integrated according to the methods and systems to control the cursor 76. In other embodiments, the cursor 76 can be directed using voice commands or by utilizing an interface that otherwise allows the cursor 76 to be positionally directed within the control area 72. In the illustrated embodiment, the illustrated cursor 76 cannot leave the control area 72.

The illustrated interface 70 can be calibrated or otherwise configured such that when the cursor 76 is placed at the origin 74, the camera position remains fixed. Accordingly, for the illustrated interface 70, the control area 72 can be understood to be continually relative to the current camera position. Consequently, as the cursor moves from the origin 74, corresponding control commands can be generated and provided to the camera 16 to allow continuous camera control and fluid camera positional movement in the pan and tilt directions. These directions can also be referred to as range and azimuth, or x and y, and the disclosed methods and systems are not limited to a choice of coordinate system or axes representation or labeling.

For purposes of discussion herein, camera 16 control can be referred to as pan and tilt, where pan can be understood to be left-right camera motion, while tilt can be understood to be camera up-down motion. With regard to the illustrated control area 72, the control area 72 can be described with reference to the cartesian coordinate system, such that left-right cursor 76 motion can be referred to herein as motion in the "x" direction, while up-down (tilt) movement can be referred to herein as cursor motion in the "y" direction. Accordingly, for the illustrated control area 72, cursor 76 movement solely in the x direction, along the x-axis origin 74, translates to panning the camera 16 with increased magnitude (speed) as the distance from the origin increases. Similarly, for the illustrated control area 72, cursor 76 movement solely in the y direction, along the y-axis origin 74, translates to tilting the camera 16, with increased magnitude (speed) as the distance from the origin increases. Furthermore, moving the cursor 76 in both the x and y directions translates to camera 16 control in both the pan and tilt directions.

The illustrated control area 72 can be calibrated such that distance from the origin 74 in the x and y directions can be translated into corresponding pan and tilt camera control commands. The calibration and camera control commands can be based on the camera 16, camera 16 type, camera interface, etc. For example, in some embodiments, the control area 72 can be understood to include a grid where the cursor 76 movement can be measured based on the grid position. The grid may or may not be visible to the user 48 via the interface 70.

For the illustrated systems and methods, camera control is only provided when the cursor 76 is activated. As an example, consider that a user "activates" the cursor 76 in the control pad area 72 by selecting the cursor 76 with a computer mouse, and subsequently drags the cursor 76 to a position that can be viewed as one unit in the x-direction, and two units in the y-direction. Based on the cursor 76 position, pan and tilt commands, or the equivalent thereof, can be provided to the camera 16 (camera driver(s)) based on the x and y cursor positioning. In some embodiments that can be dependent upon the camera 16, camera commands can be provided for diagonal movement of the camera 16, or incremental pan and tilt movements can be provided to the camera 16 to achieve the desired positioning. For the illustrated systems and methods, should the user 48 maintain an active cursor 76 at a fixed, non-origin position, camera commands of the same magnitude and in a continuing process can be transmitted to the camera 16. Alternately, in the illustrated embodiments, when the user 48 "deactivates" or inactivates the cursor 76 in the control pad area 72, including releasing a computer mouse button, the illustrated cursor 76 can return to the origin 74, thereby ceasing the transmission of control commands to the camera 16. In an embodiment, deactivation of the cursor 76 can cause the transmission of a "stop" command to the camera 16. In some embodiments, deactivating the cursor 76 can cause the camera 16 to receive pan and tilt commands that do not provide any camera 16 movement. Accordingly, one of ordinary skill in the art will recognize that cursor positioning at the origin 74 can provide an option to cease camera control command transmission, or can equivalently cause camera control commands to be transmitted that cause no camera 16 movement. Different camera control commands can be generated from the illustrated interface 70, and in particular, the cursor 76 position, depending upon camera 16 and other system requirements.

Accordingly, for the illustrated interface 70, the further the distance of the cursor 76 from the origin 74, the greater the magnitude of the camera control commands. In one embodiment, if camera control commands are provided in a continuous manner, at fixed intervals such as once every millisecond, based on the cursor 76 position, greater magnitude commands can translate into more rapid camera movement as the camera 16 can attempt to move a greater distance in the same one millisecond command interval. As indicated herein, the maximum camera control commands for one camera 16 can be different from the maximum camera control commands for another camera 16, and hence the interface 70 can be calibrated accordingly. In some embodiments, the same interface calibration can be used for multiple cameras, with the calibrations performed as the cursor position is translated to camera commands.

As FIG. 4 also indicates, the interface 70 can include options for focusing 78 and zooming 80 the camera 16.

Because the illustrated focus 78 and zoom 80 features are not included in the illustrated control area 72, utilization of such features implies that the control pad cursor 76 is deactivated or inactivated and hence positioned at the origin 74, thereby indicating a non-mobile camera 16. Although the illustrated interface 70 does not include a visible cursor for the focus 78 and zoom 80 areas, it can be understood that a cursor can be activated for those areas 78, 80 when the user 48 depresses a button in the illustrated regions 78, 80 or otherwise causes the focus 78 and/or zoom 80 features to be enabled. For one embodiment using the illustrated interface 70, depressing a computer mouse button in the focus or zoom areas 78, 80 can be understood to be cursor activation, while releasing the computer mouse button can be understood to be cursor inactivation. In some embodiments, dual control of the cursor 76 and focus 78 and/or zoom 80 features can be available, and in some embodiments, the focus 78 and/or zoom 80 features can be combined with the features of the control pad 72.

Although not illustrated in FIG. 4, an interface or GUI for the disclosed methods and systems can include controls for camera presets, previously defined herein as camera settings or features that can include white/black balance, iris, gain, RGB, phase, timing, SC, and other like features.

As indicated previously, continuous camera control can be understood herein to include control commands that can be transmitted to the camera at fixed intervals for a given time period. For example, as previously provided, camera commands can be transmitted to the camera 16 while the cursor 76 is active, and such commands can be sampled and/or transmitted at a rate of once per millisecond. As also indicated herein, control commands can vary, and can include, for example, pan, tilt, focus, zoom, camera presets, or combinations thereof. Accordingly, in one embodiment of the methods and systems herein, the given time interval during which control commands can be generated can be, for example, the time period during which the cursor 76 is active. As indicated herein, for the illustrated interface 70, the cursor can be active in the control pad area 72, or while operating the focus 78 and/or zoom 80 features.

The illustrated interface 70 also includes a location preset camera positioning option 82 such that a user can designate a fixed camera position for future retrieval. The illustrated interface 70 thus provides a drop-down box 82 that can retrieve previously defined or stored camera positions. Selections of the predefined positions can cause appropriate camera commands to be transmitted to the camera 16, to cause the camera 16 to be positioned at the desired, specified, and predefined position or location.

The FIG. 4 interface 70 also provides an option to exit 84. When a user 48 selects the illustrated exit option 84, the user 48 relinquishes control of the camera 16. In some embodiments, exit 84 selection can cause the interface 70 to be eliminated from the user's display, while in other embodiments, exit 84 selection merely causes the user to relinquish camera control.

As indicated previously herein, the methods and systems include features for allowing more than one user 48 to control a camera 16 over a network interface. The illustrated methods and systems can implement a dynamic queuing feature that can facilitate the shared control. In the illustrated systems as provided in FIGS. 3 and 4, users 48 can subscribe to or otherwise register with the web server 64 or control server 50. Such users 48 can, for example, be provided user names, accounts, passwords, and login information such that when the registered users 48 access the web server 64, the users can be recognized as a subscriber or registrant. The methods and systems disclosed herein can also make features available to a system administrator of the web server 64 or the control server 50 that can allow the server(s) 64, 50 to provide designated features, capabilities, or privileges to subscriber users 48. Alternately, a system administrator can configure the methods and systems such that non-subscriber users 48 may not be afforded or provided such privileges. Accordingly, the methods and systems can allow camera control options for subscriber users (e.g., pay-per-view access), non-subscriber users, and system administrators.

In one embodiment of the illustrated systems and methods, subscriber users can be provided priority regarding camera control. Accordingly, for the illustrated embodiments, a camera 16 can be controlled by only one user 48 at a single time. Requests for camera control can hence be initiated by a user 48 and received by the web server 64, for example. Based on the user's status as a subscriber or non-subscriber, the web server 64 can generate a camera control queue that provides priority to subscriber users 48. Camera control can be for a specified time interval, and camera control intervals for subscribers can be different than camera control intervals for non-subscribers. In some embodiments, camera control intervals can be based on the number of requests. In an embodiment, camera control intervals can be based on subscriber fees. Camera control interval features can be configured by a system administrator.

Those with ordinary skill in the art will recognize that there are various systems and methods for managing queues, and such methods and systems can be designated by a system administrator based on system requirements. In one embodiment, non-subscriber requests may only be processed after subscriber requests are fulfilled. Additionally and optionally, subscriber camera control time intervals can be longer than non-subscriber intervals. Once a camera control time interval expires, the user 48 can be automatically re-entered into the camera control queue. Alternately, a user 48 who terminates (e.g., "exit" 84) the camera control interval before expiration may not be re-entered into the queue.

In some embodiments, subscriber requests may only take precedence over non-subscriber requests at predefined times. In an embodiment, the system administrator can usurp control of the camera 16 from a user 48. Once the system administrator relinquishes camera control, the requests for queuing can be processed based on the queue status before the system administration usurpation. A camera control interval associated with the user 48 from which control was usurped by the system administrator, can be suspended such that when the system administrator relinquishes control, the user 48 from which camera control was usurped can be credited with control and the remaining camera control interval before the usurping.

In some embodiments, system administrators can remove a user from the queue, and/or permanently deny a user of privileges. Furthermore, a system administrator can usurp control from a user, and thereafter prevent the camera control from returning to that user. In an embodiment, system administrators do not have time limits on camera control.

In some embodiments, users 48 can be provided with a display of the current camera control user's remaining camera control time interval. Such display can be represented as a reverse stop-watch display. Users 48 can also be presented with a display of the camera control queue order, where users can be identified by login name or other specified identity data. Such data can influence a user 48 to request control of one camera 16 in contrast to requesting control of another camera 16 that may have more requests.

Figure 5A:
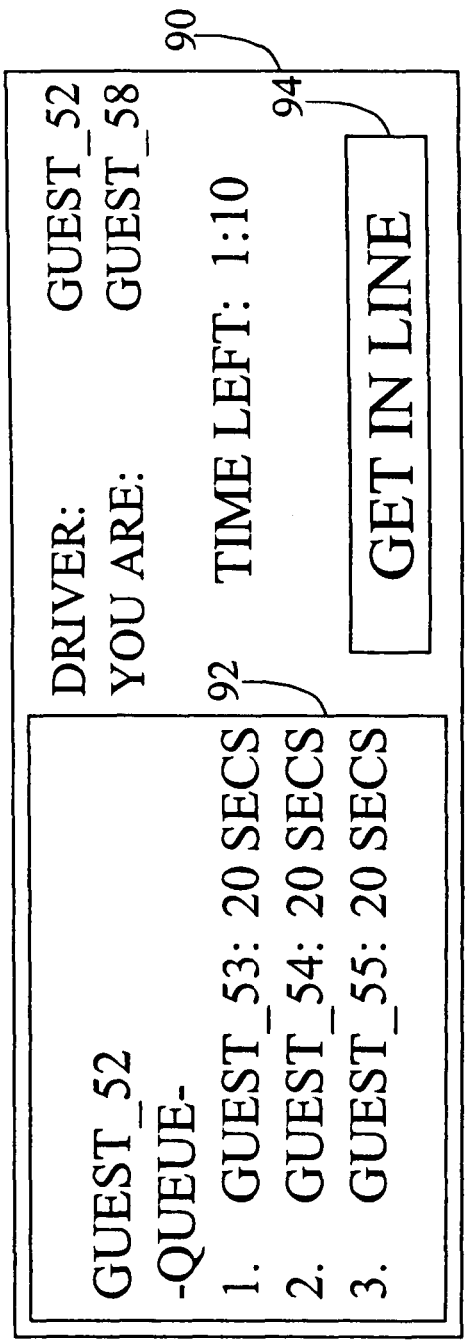
FIG. 5A and FIG. 5B present illustrative interfaces for providing queue status and control.
Figure 5B:
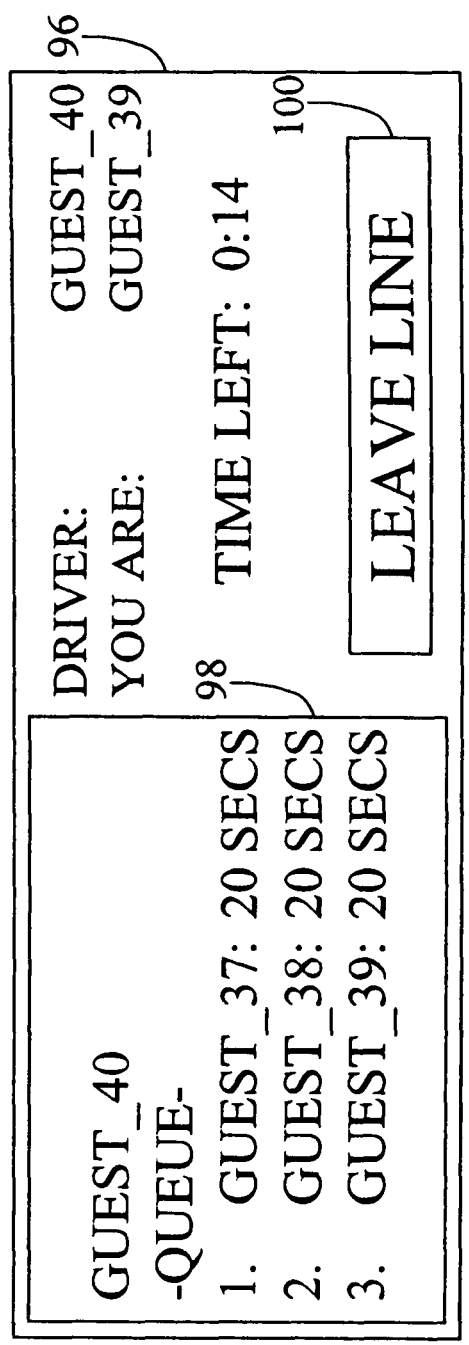

An illustration of one display method or interface for the methods and systems herein can be seen in FIGS. 5A and 5B.

FIG. 5A displays an interface 90 wherein the user in control of the camera 16 is called the "driver", and is identified as Guest_52. The user being shown the display is known as Guest_58, and a queue status display 92 can indicate the current driver and the queue status that includes three parties, the associated queue order for camera control for the three parties, and the time allotted for the three parties. The display 90 also includes the status of the current driver's time interval, and an option 94 to allow the present user (i.e., Guest_58) to enter the queue.

FIG. 5B presents an interface 96 that allows a user to exit the queue. The FIG. 5B an interface 96 is similar to the FIG. 5A interface 90 and provides a queue status area 98 and a user-selectable option to exit from the queue 100.

When a user in the queue becomes the driver and is provided camera control, the driver can be provided with both visual and audio indications of such status. For example, in one embodiment, the new driver can be provided an audio signal such as a beep. Additionally and optionally, the driver's interface and/or display can be altered to indicate control mode versus queue mode.

For the illustrated systems and methods, a chat feature can be simultaneously provided on the display that includes the audio-visual data from the camera 16. Users can accordingly share comments and other data via the chat feature. The chat feature(s) can allow real-time chat and can be implemented using an applet or applet tag 66 that can be located on the web server 64. Based on the disclosed methods and systems, chat features can be provided to internet users, television users, and other system users.

The disclosed methods and systems can also be utilized to allow the transmission, broadcast, and/or webcast of live performances, or commercials, that can be understood herein as LiveMercials. In one embodiment of LiveMercials, an advertiser or sponsor can purchase or otherwise negotiate media space and/or time on a network that utilizes the disclosed methods and systems. The advertiser can determine the location and/or camera from which to collect the audio/visual data, the target audience to receive the collected data, the time to collect and/or broadcast or distribute the data, and the format for the audio/video data distribution. In some embodiments, audience members can participate on-site and/or on-line using a real-time ratings system that can provide real-time feedback from the audience to the advertiser. As disclosed herein, a LiveMercial can include audio and visual data.

In one example of LiveMercials, live auctions can be performed by allowing products and/or services to be presented for bidding by real-time, on-site and/or on-line audience members.

Those with ordinary skill in the art will recognize that the methods and systems disclosed herein can be platform independent and can operate using a variety of operating systems. As indicated previously, the methods and systems can also be independent of the camera. As indicated herein, in some embodiments, a user can be provided with a choice of cameras from which to select, wherein the several cameras can be positionally distinct.

What has thus been described are methods and systems for providing fluid real-time camera control of at least one camera to at least one network user via a network including the internet. A control pad or area can be provided to camera users via an application or applet that can be calibrated to provide fluid camera control. Compressed or uncompressed analog, digital, or streaming video and audio data can also be provided to the users to allow real-time low latency continuous audio/visual feedback. Multiple camera users can obtain control of a camera using a dynamic queuing technique that can allow single user camera control for certain time intervals. An administrator can establish user camera control parameters including camera control intervals for subscriber users versus non-subscriber users, camera usurping by an administrator, elimination of camera control privileges for a user, and denial of camera control requests by a user.

The methods and systems described herein are not limited to a particular hardware or software configuration, and may find applicability in many computing or processing environments. The methods and systems can be implemented in hardware or software, or a combination of hardware and software. The methods and systems can be implemented in one or more computer programs executing on one or more programmable computers that include a processor, a storage medium readable by the processor (including volatile and non-volatile memory and/or storage elements), one or more input devices, and one or more output devices.

The computer program(s) is preferably implemented using one or more high level procedural or object-oriented programming languages to communicate with a computer system; however, the program(s) can be implemented in assembly or machine language, if desired. The language can be compiled or interpreted.

The computer program(s) can be preferably stored on a storage medium or device (e.g., CD-ROM, hard disk, or magnetic disk) readable by a general or special purpose programmable computer for configuring and operating the computer when the storage medium or device is read by the computer to perform the procedures described herein. The system can also be implemented as a computer-readable storage medium, configured with a computer program, where the storage medium so configured causes a computer to operate in a specific and predefined manner.

Although the methods and systems have been described relative to a specific embodiment thereof, they are not so limited. Obviously many modifications and variations may become apparent in light of the above teachings. For example, as indicated previously herein, multiple cameras can be controlled by a single user, and the multiple cameras can be of different types with different connections (wired, wireless, satellite, infrared, laser, etc.) between the user and the camera or intermediate elements between the user and camera(s). Although the interface presented herein for camera control included a GUI with a cursor, other interfaces can be utilized that do not utilize a cursor for camera control, and can use other graphics or schemes to provide and/or demonstrate control features. Although the illustrated interface included an origin designation in the center of the interface, the origin can be at a different location in the interface. Furthermore, in some embodiments, an origin designation may not be included, and cursor activation can occur by, for example, clicking a computer mouse in the control area. Although the illustrated interface also included buttons for increasing and decreasing focus and zoom, other methods for generating focus and zoom commands can be provided. The user interface can be, for example, text-based or menu driven in some embodiments, rather than graphical.

Many additional changes in the details, materials, and arrangement of parts, herein described and illustrated, can be made by those skilled in the art. Accordingly, it will be understood that the following claims are not to be limited to the embodiments disclosed herein, can include practices otherwise than specifically described, and are to be interpreted as broadly as allowed under the law.

The invention claimed is:

1. A method for providing control of at least one camera to at least one network user, comprising:
   providing at least one network link between the at least one camera and the at least one network user;
   providing at least one interface having a cursor and a control area to the at least one network user, the at least one interface generating variable speed camera control commands based on the cursor position within the control area; and,
   providing the variable speed camera control commands to the at least one camera.

2. A method according to claim 1, further comprising providing the at least one network user with at least one of compressed analog, uncompressed analog, digital, and streaming audio and visual data, based on the at least one camera;
   where providing at least one network link between the at least one camera and the at least one network user includes providing at least one network link based on supporting at least one of fiber optic, infrared, satellite, Radio Frequency (RF), microwave, cable, and Internet Protocol (IP) communications;
   where providing at least one interface to the at least one user includes providing at least one of at least one applet, at least one application, at least one graphical user interface, at least one database interface, at least one scripting interface, at least one menu driven interface, and at least one text-based interface;
   where providing at least one interface includes providing the cursor with an active state and an inactive state;
   where generating variable speed camera control commands includes determining a distance of a cursor from an origin; and
   where providing the variable speed camera control commands to the at least one camera includes transmitting the camera control commands using the at least one network link.

3. A method according to claim 1, further comprising the action of moving the cursor from an origin to generate the variable speed camera control commands to obtain fluid camera positional movement in pan tilt directions.

4. A method according to claim 1, further comprising the action of moving the cursor in an x direction along an x-axis origin to obtain camera panning with increased speed as a distance from the origin increases.

5. A method according to claim 4, further comprising providing a grid to the user where distance of the cursor from the origin is measured based on the grid position.

6. A method according to claim 1, where generating variable speed camera control commands includes determining whether a cursor is active or inactive.

7. A method according to claim 1, where generating variable speed camera control commands includes computing at least one of pan, tilt, focus, zoom, and camera preset commands based on the interface data.

8. A method according to claim 1, further comprising the action of the user dragging the cursor to a position, with respect to an origin, one unit in an x-direction, and greater than one unit in a y-direction, wherein the camera moves in a tilt direction faster than the camera moves in a pan direction.

9. A method according to claim 1, further comprising the action of deactivating the cursor by releasing a computer mouse button, wherein upon deactivation, the cursor returns to an origin and thus ceases transmission of control commands to the camera.

10. A method according to claim 1, further including selecting one of the at least one network users from which to provide control of the at least one camera.

11. A method according to claim 1, further including providing a queue for control of the at least one camera amongst the at least one network users.

12. A graphical user interface (GUI) for providing control of at least one camera by at least one network user, the at least one network user and the at least one camera being connected by at least one communicative network link, the GUI comprising:
    a control area; and
    a cursor confined within the control area,
    where variable speed camera control commands are generated based on the cursor position within the control area.

13. A GUI according to claim 12, further including:
    an origin designation within the control area, and where the variable speed control command is based on the cursor distance from the origin designation;
    at least one focus button for increasing and decreasing camera focus;
    at least one zoom button for increasing and decreasing camera zoom;
    at least one control for camera presets; and
    at least one location preset designation for directing the camera to a fixed location,
    where the cursor includes an active mode and an inactive mode, and where the control area includes a coordinate system for mapping cursor position to variable speed camera control commands.

14. A GUI according to claim 12, wherein the GUI is configured such that movement of the cursor from an origin to generate the variable speed camera control commands to obtain fluid camera positional movement in pan tilt directions.

15. A GUI according to claim 12, wherein the GUI is configured such that movement of the cursor in an x direction along an x-axis origin to obtain camera panning with increased speed as a distance from the origin increases.

16. A GUI according to claim 12, wherein the GUI is configured such that dragging the cursor to a position, with respect to an origin, one unit in an x-direction, and greater than one unit in a y-direction, moves the camera in a tilt direction faster than the camera moves in a pan direction.

17. A GUI according to claim 12, wherein the GUI is configured such that the cursor may be deactivated by releasing a computer mouse button, wherein upon deactivation, the cursor returns to an origin and thus ceases transmission of control commands to the camera.

18. A GUI according to claim 12, where the control area includes a coordinate system for mapping cursor position to pan and tilt variable speed camera control commands.

19. A method for administering control of at least one camera to at least one network user, comprising:
    associating at least one queue with the at least one camera;
    receiving a request from one of the at least one network users for control of the at least one camera;
    associating the request with one of the at least one camera; and
    conditionally placing the at least one network user in the at least one queue associated with the request.

20. A method according to claim 19, where conditionally placing the at least one network user in the at least one queue associated with the request includes determining that the at least one network user is authorized to request control of the at least one camera, and where conditionally placing the at least one network user in the at least one queue associated with the request includes determining whether the at least one requesting user is a subscriber user or a non-subscriber user.

21. A GUI according to claim 12, wherein the GUI is configured such that when the cursor is moved from an origin, the further a distance of the cursor is moved from the origin, the greater a magnitude of the camera control commands.

22. A GUI according to claim 12, wherein the GUI is configured such that the action of moving the cursor results in movement of the camera, wherein, based on a position of the cursor, a greater magnitude of cursor movement corresponds to a more rapid camera movement.

23. A method according to claim 19, further including associating a camera control time interval with the request.

24. A method according to claim 19, further including providing an indication to assume camera control to the at least one network user, where providing an indication includes at least one of sending a message via a network for display to at least one network user, and causing an audio sound to be provided to at least one network user.

25. A GUI according to claim 12, wherein the GUI is configured such that movement of the cursor faster in a first time period relative to cursor movement in a second time period equal to the first time period results in faster movement of the camera during the first time period than during the second time period.

26. A system for providing remote control of at least one camera by at least one network user, comprising:
    at least one initiating device for providing access to the at least one network user over a network, the initiating device having a display for displaying, an interface having a cursor and a control area, the interface providing variable speed camera control commands based on the cursor position within the control area, and, video data received from the at least one camera,
    at least one server to receive the variable speed camera control commands from the at least one initiating device, to provide the variable speed camera control commands to the at least one camera, to receive at least one of audio and video data from the at least one camera, and to provide at least one of the audio and video data to the at least one network user, and
    instructions for translating the variable speed camera control commands to instructions for moving the at least one camera.

27. A system according to claim 26, where the at least one initiating device includes at least one processor.

28. A system according to claim 26, further including at least one queue associated with the at least one camera.

29. A system according to claim 26, where the interface includes at least one of a graphical user interface (GUI), a database interface, a scripting interface, a menu driven interface, and a text-based interface.

30. A system according to claim 26, further comprising:
    the control area having an origin,
    the cursor having an active state and an inactive state, and
    whereby the variable speed control commands are based on the distance between the cursor in the active state and the origin.

31. A system according to claim 30, where the cursor is at least one of visible and non-visible.

32. A system according to claim 30, where the control area includes a grid, the grid being at least one of visible and non visible.

33. A system according to claim 30, where the variable speed control commands are constant when the cursor is maintained in the same position.

34. A system according to claim 30, where the cursor remains at the origin when in the inactive state.

35. A computer product for providing control of at least one camera to at least one network user, the computer product disposed on a computer readable medium and having instructions for causing a processor to:
    provide at least one network link between the at least one camera and the at least one network user;
    provide at least one interface to the at least one network user, the at least one interface having a cursor and a control area;
    generate variable speed camera control commands based on interface data generated from the position of the cursor within the control area of the at least one interface;
    provide the variable speed camera control commands to the at least one camera; and
    utilize the at least one network link to provide the at least one network user with data based on the at least one camera.

36. A computer product according to claim 35, where instructions to provide at least one network link between the at least one camera and the at least one network user include instructions to provide at least one network link based on supporting at least one of fiber optic, infrared, satellite, Radio Frequency (RF), microwave, cable, and Internet Protocol (IP) communications.

37. A computer product according to claim 35, where instructions to provide at least one interface to the at least one user include instructions to provide at least one of at least one applet, at least one application, at least one graphical user interface, at least one database interface, at least one scripting interface, at least one menu driven interface, and at least one text-based interface.

38. A computer product according to claim 35, where instructions to provide at least one interface include instructions to provide the cursor with an active state and an inactive state.

39. A computer product according to claim 35, where instructions to generate variable speed camera control commands includes instructions to determine a distance of a cursor from an origin.

40. A computer product according to claim 35, where instructions to generate variable speed camera control commands includes instructions to determine whether a cursor is in the active state or inactive state.

41. A computer product according to claim 35, where instructions to generate variable speed camera control commands includes instructions to compute at least one of pan, tilt, focus, zoom, and camera preset commands based on the interface data.

42. A computer product according to claim 35, further including instructions to select one of the at least one network users from which to provide control of the at least one camera.

43. A computer product according to claim 35, further including instructions to provide a queue for providing control of the at least one camera amongst the at least one network users.

44. A computer for administering control of at least one camera to at least one network user, the computer product disposed on a computer readable medium and having instructions for causing a processor to:
    provide at least one queue for association with the at least one camera;
    receive a request from one of the at least one network users for control of the at least one camera;

associate the request with one of the at least one cameras; and conditionally place the at least one network user in the at least one queue associated with the request.

45. A computer product according to claim 44, where the instructions to conditionally place the at least one network user in the at least one queue associated with the request includes instructions to determine that the at least one network user is authorized to request control of the at least one camera.

46. A computer product according to claim 44, where the instructions to conditionally place the at least one network user in the at least one queue associated with the request includes instructions to determine whether the at least one requesting user is a subscriber user or a non-subscriber user.

47. A computer product according to claim 44, wherein the computer product is configured such that when the cursor is moved from an origin, the further a distance of the cursor is moved from the origin, the greater a magnitude of the camera control commands.

48. A computer product according to claim 44, wherein the computer product is configured such that the action of moving the cursor results in movement of the camera, wherein, based on a position of the cursor, a greater magnitude of cursor movement corresponds to a more rapid camera movement.

49. A computer product according to claim 44, wherein the computer product is configured such that movement of the cursor from an origin to generate the variable speed camera control commands to obtain fluid camera positional movement in pan tilt directions.

50. A computer product according to claim 44, wherein the computer product is configured such that movement of the cursor in an x direction along an x-axis origin to obtain camera panning with increased speed as a distance from the origin increases.

51. A computer product according to claim 44, wherein the computer product is configured such that dragging the cursor to a position, with respect to an origin, one unit in an x-direction, and greater than one unit in a y-direction, moves the camera in a tilt direction faster than the camera moves in a pan direction.

52. A system for providing remote control of at least one camera by at least one network user, comprising:
means for providing access for at least one network user to a network, the means for providing access having a display for displaying,
an interface having a cursor and a control area, the interface providing variable speed camera control commands based on the position of the cursor within the control area, and,
video data from the at least one camera,
processor means to receive the variable speed camera control commands from the at least one initiating device, to provide the variable speed camera control commands to the at least one camera, to receive at least one of audio and video data from the at least one camera, and to provide at least one of the audio and video data to the at least one network user, and
instructions for translating the variable speed camera control commands to instructions for moving the at least one camera.

53. A system according to claim 52, where the means for providing access includes at least one processor.

54. A system according to claim 52, further including at least one queue associated with the at least one camera.

55. A system according to claim 52, where the interface includes at least one of a graphical user interface (GUI), a database interface, a scripting interface, a menu driven interface, and a text-based interface.

56. A system according to claim 52, further comprising:
the control area having an origin,
the cursor having an active and an inactive state,
where the variable speed control commands are based on the distance between the cursor in the active state and the origin.

57. A system according to claim 56, where the cursor is at least one of:
visible and non-visible.

58. A system according to claim 56, where the control area includes a grid, the grid being at least one of visible and non-visible.

59. A system according to claim 56, where the variable speed control commands are constant when the cursor is maintained in the same position.

60. A system according to claim 56, where the cursor remains at the origin when in the inactive state.

61. A method according to claim 1, further comprising the action of moving the cursor away from an origin, wherein the further a distance of the cursor is moved from the origin, the greater a magnitude of the camera control commands.

62. A method according to claim 1, further comprising the action of moving the cursor so as to obtain movement of the camera, wherein, based on a position of the cursor, a greater magnitude of cursor movement corresponds to a more rapid camera movement.

63. A method according to claim 1, further comprising the action of moving the cursor faster in a first time period relative to cursor movement in a second time period equal to the first time period so as to obtain a faster movement of the camera during the first time period than during the second time period.

64. A computer product according to claim 44, wherein the computer product is configured such that the cursor may be deactivated by releasing a computer mouse button, wherein upon deactivation, the cursor returns to an origin and thus ceasing transmission of control commands to the camera.

65. A computer product according to claim 44, wherein the computer product is configured such that the action of moving the cursor results in movement of the camera, wherein, based on a position of the cursor, a greater magnitude of cursor movement corresponds to a more rapid camera movement.

66. A computer product according to claim 44, wherein the computer product is configured such that movement of the cursor faster in a first time period relative to cursor movement in a second time period equal to the first time period results in faster movement of the camera during the first time period than during the second time period.

* * * * *